US009991784B2

(12) United States Patent
Childs et al.

(10) Patent No.: US 9,991,784 B2
(45) Date of Patent: Jun. 5, 2018

(54) DYNAMIC CURRENT LIMIT CIRCUIT

(71) Applicant: Dialog Semiconductor (UK) Limited, London (GB)

(72) Inventors: Mark Childs, Swindon (GB); Martin Faerber, Munich (DE); Jens Masuch, Munich (DE); Giulio de Vita, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days. days.

(21) Appl. No.: 15/255,903

(22) Filed: Sep. 2, 2016

(65) Prior Publication Data

US 2018/0069468 A1     Mar. 8, 2018

(51) Int. Cl.
| | | |
|---|---|---|
| H03M 1/00 | (2006.01) | |
| H02M 1/32 | (2007.01) | |
| H02M 3/158 | (2006.01) | |
| H02M 1/00 | (2006.01) | |

(52) U.S. Cl.
CPC ............. *H02M 1/32* (2013.01); *H02M 3/158* (2013.01); *H02M 2001/0009* (2013.01)

(58) Field of Classification Search
CPC .................. H02M 1/32; H02M 3/158; H02M 2001/0009; H03F 2203/30151; H03F 2203/45096; H03M 1/005; H03M 1/0612; H03M 1/664; H03M 1/66; H03M 1/747
USPC .................................................. 341/135, 144
See application file for complete search history.

(56) References Cited

U.S. PATENT DOCUMENTS

| | | | |
|---|---|---|---|
| 6,329,804 B1 | 12/2001 | Mercer | |
| 7,960,997 B2* | 6/2011 | Williams | .......... H01L 23/49575 324/762.09 |
| 8,008,902 B2 | 8/2011 | Melanson et al. | |
| 9,013,163 B2 | 4/2015 | Faerber | |
| 9,500,678 B2* | 11/2016 | Williams | .......... H01L 23/49575 |
| 2009/0059632 A1 | 3/2009 | Li et al. | |
| 2009/0167579 A1 | 7/2009 | Kawano | |
| 2010/0164455 A1 | 7/2010 | Li et al. | |

(Continued)

FOREIGN PATENT DOCUMENTS

| | | |
|---|---|---|
| DE | 20 2014 002 223 | 5/2014 |
| DE | 10 2015 204 021 | 9/2016 |

(Continued)

OTHER PUBLICATIONS

German Office Action, Reference Number: 10 2016 220 715.6, Applicant: Dialog Semiconductor (UK) Limited, dated Jun. 2, 2017, 9 pgs, and English language translation, 12 pgs.

*Primary Examiner* — Jean B Jeanglaude
(74) *Attorney, Agent, or Firm* — Saile Ackerman LLC; Stephen B. Ackerman

(57) ABSTRACT

A system is disclosed which provides a dynamic current limit circuit that accurately defines both the lower and the upper limits for the current limit. The circuit ensures both the lower and upper current limits are well-controlled. The lower current limit is matched to the normal pulse-frequency modulation (PFM) limit, and the upper current limit is matched to the pulse-width modulation (PWM) limit. This implementation has several key benefits, including making the peak current limit accurate in both sync and dynamic sleep modes. If the scheme is carefully designed, the dynamic sleep current limit gives the best load transient response.

23 Claims, 8 Drawing Sheets

(56) References Cited

U.S. PATENT DOCUMENTS

| | | |
|---|---|---|
| 2012/0091981 A1 | 4/2012 | Komiya |
| 2015/0097542 A1 | 4/2015 | Repton et al. |
| 2016/0070291 A1 | 3/2016 | Malinowski |
| 2016/0111956 A1 | 4/2016 | Childs |
| 2016/0259355 A1 | 9/2016 | Farber et al. |
| 2017/0070145 A1 | 3/2017 | Childs et al. |

FOREIGN PATENT DOCUMENTS

| | | |
|---|---|---|
| DE | 10 2016 206 098 | 3/2017 |
| EP | 2 144 356 | 1/2010 |

* cited by examiner

DYNAMIC CURRENT LIMIT CIRCUIT

BACKGROUND

Field

The disclosure relates generally to a DC-DC switching power converter, employing pulse-frequency modulation (PFM) mode.

Description of Related Art

Buck switching converters typically run in one of two modes, pulse-frequency modulation (PFM) or pulse-width modulation (PWM).

PFM mode is typically used for low load currents. In this mode, the Buck switching converter turns on the high side device when the output voltage falls below the reference (DAC) voltage. The high side device is then turned off when the current in the coil reaches a threshold value, a sleep current limit. The low side device is turned on when the high side device is turned off. The low side device is then turned off when the current in the coil is fully discharged. PFM mode is not typically used for large currents, as the current limit is normally set low to maximize efficiency.

In existing Buck switching converter designs, the current limit is generated using an amplifier to increase the current reference. However, this method has disadvantages.

The existing implementations do not allow a well-controlled minimum current limit value. This is an issue because if the minimum current limit value is not smaller than the normal PFM mode current limit, there can exist a range of currents that the Buck switching converter cannot support in either mode.

The existing implementations also do not allow a well-controlled maximum current limit value. The circuits used may allow some control of this maximum value, but the value does not track the accurately controlled PWM current limit.

SUMMARY

An object of the disclosure is to provide a dynamic current limit circuit.

Further, another object of this disclosure is to ensure the dynamic current limit circuit is fast to react and power-efficient.

Still, another object of this disclosure is to ensure the lower current limit of the dynamic current limit circuit is maintained and matched to the normal pulse-frequency modulation (PFM) limit.

Still, another object of this disclosure is to ensure the upper current limit of the dynamic current limit circuit is maintained and matched to the pulse-width modulation (PWM) limit.

A still further object is to scale the output current correctly as the number of phases that are active is varied.

To accomplish the above and other objects, a dynamic current limit circuit is disclosed, comprised of a sync current output, configured with a first current Digital to Analog Converter (IDAC). The dynamic current limit circuit is further comprised of a dynamic sleep amplifier, configured to subtract current from the sync current output in dynamic sleep mode and not active in sync mode. Mirror circuits are configured to mirror the difference between the sync current output and dynamic sleep mode current output. A sleep current output is configured with a second current IDAC. A mirrored dynamic sleep mode current output is configured to subtract from the sleep current output, setting a sleep current output. A mirrored sleep current output is configured to add to a second mirrored dynamic sleep mode current output. A current output is scaled for the phases of a multiphase switching converter.

The above and other objects are further achieved by a method for a dynamic current limit. The steps include providing a dynamic current limit circuit. Ensuring the circuit is fast to react and power efficient, is provided. Ensuring the lower current limit of the dynamic current limit circuit is well-controlled, and matched to the pulse-frequency modulation (PFM) limit, is provided. Ensuring the upper current limit of the dynamic current limit circuit is well-controlled and matched to the pulse-width modulation (PWM) limit, is provided.

In various embodiments the objects may be achieved by implementing sync, sleep, and dynamic sleep mode currents configured to vary depending on the number of phases that are active in each mode.

In various embodiments, the objects may be achieved by implementing a sync current output, configured with a current Digital to Analog Converter (IDAC), scaled to a factor of a current.

In various embodiments, the objects may be achieved by implementing a sleep current output, configured with a current Digital to Analog Converter (IDAC), scaled to a factor of a current.

DETAILED DESCRIPTION

The disclosure provides a dynamic current limit circuit that accurately defines both the lower and the upper limits for the current limit. The lower current limit is matched to the normal pulse-frequency modulation (PFM) limit, and the upper current limit is matched to the pulse-width modulation (PWM) limit.

In addition to PFM and PWM modes, buck switching converters may have a third mode of operation called dynamic sleep mode. In this mode, the switching converter operates in PFM mode, and the current limit is controlled using an amplifier, which compares the output voltage with the DAC voltage. As the output voltage falls, the current limit is increased and the switching converter is able to handle large output currents. Dynamic sleep mode is a constant off time current control scheme, where the Buck switching converter operates mostly in discontinuous current mode (DCM), in sleep mode, and in continuous current mode (CCM), in dynamic sleep mode.

Figure 1:
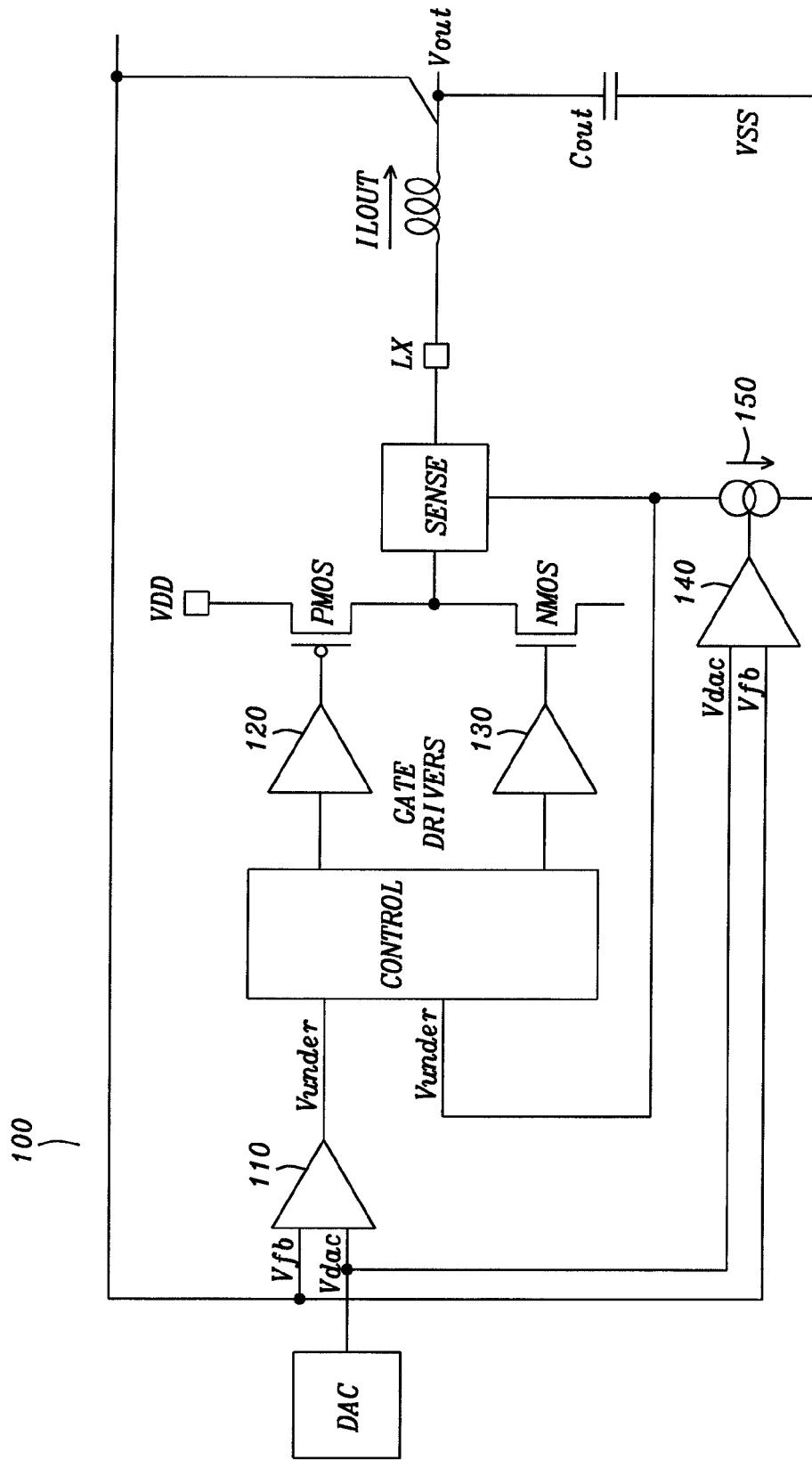
FIG. 1 illustrates the basic function for dynamic sleep mode for a Buck switching converter.

FIG. 1 illustrates the basic function for dynamic sleep mode 100, for a Buck switching converter. In dynamic sleep mode, the high side PMOS device turns on, whenever the feedback voltage VFB falls below the DAC voltage, setting VUNDER, an input to CONTROL. PMOS will turn on with gate driver 120, and coil current ILOUT will ramp up. When the current limit is achieved, and PMOS turns off, NMOS turns on with gate driver 130. PMOS is then held off for a fixed amount of time, the minimum off time. Once this time expires, NMOS turns off and PMOS is allowed to turn back on, when feedback voltage VFB falls back below the DAC voltage.

If the load is high, the voltage is below VDAC and the high side device is ready to turn on. One of the pass-devices is therefore always on, and the coil current is continuous. In normal sleep mode, the current limit, which turns PMOS off, is fixed. In dynamic sleep mode, the current limit is allowed to vary to enable the Buck switching converter to support high loads. The circuit works by sensing the output current in SENSE at node LX, when PMOS is on. This is compared to reference current 150. When output current ILOUT, across inductor LOUT, is higher than the reference current, the current limit is triggered and PMOS turns off. Output voltage VOUT is observed across capacitor COUT.

The reference current is fixed in normal sleep mode. In dynamic sleep mode, the reference current is modulated by amplifier 140, which compares VFB to VDAC. As VFB falls further below VDAC, reference current 150 is increased, and the current limit value is also increased.

This implementation has several key benefits, including making the peak current limit accurate in both sync and dynamic sleep modes. Sync mode is defined as traditional peak current mode control (current mode PWM). In this mode the PMOS is turned on with the clock, and turned off with a control signal based on the output coil current. The control signal is generated by defining a target peak output current based on the output voltage error (the target peak current is proportional to the difference between the target output voltage and the actual output voltage). Then the current is compared to the target and the PMOS is turned off once the output current exceeds the target current. An artificial compensation ramp is added to the sensed output current to prevent sub-harmonic oscillation. This is traditional peak current mode control. In the disclosure, the dynamic sleep current limit is initially high, giving the best load transient response.

Figure 2:
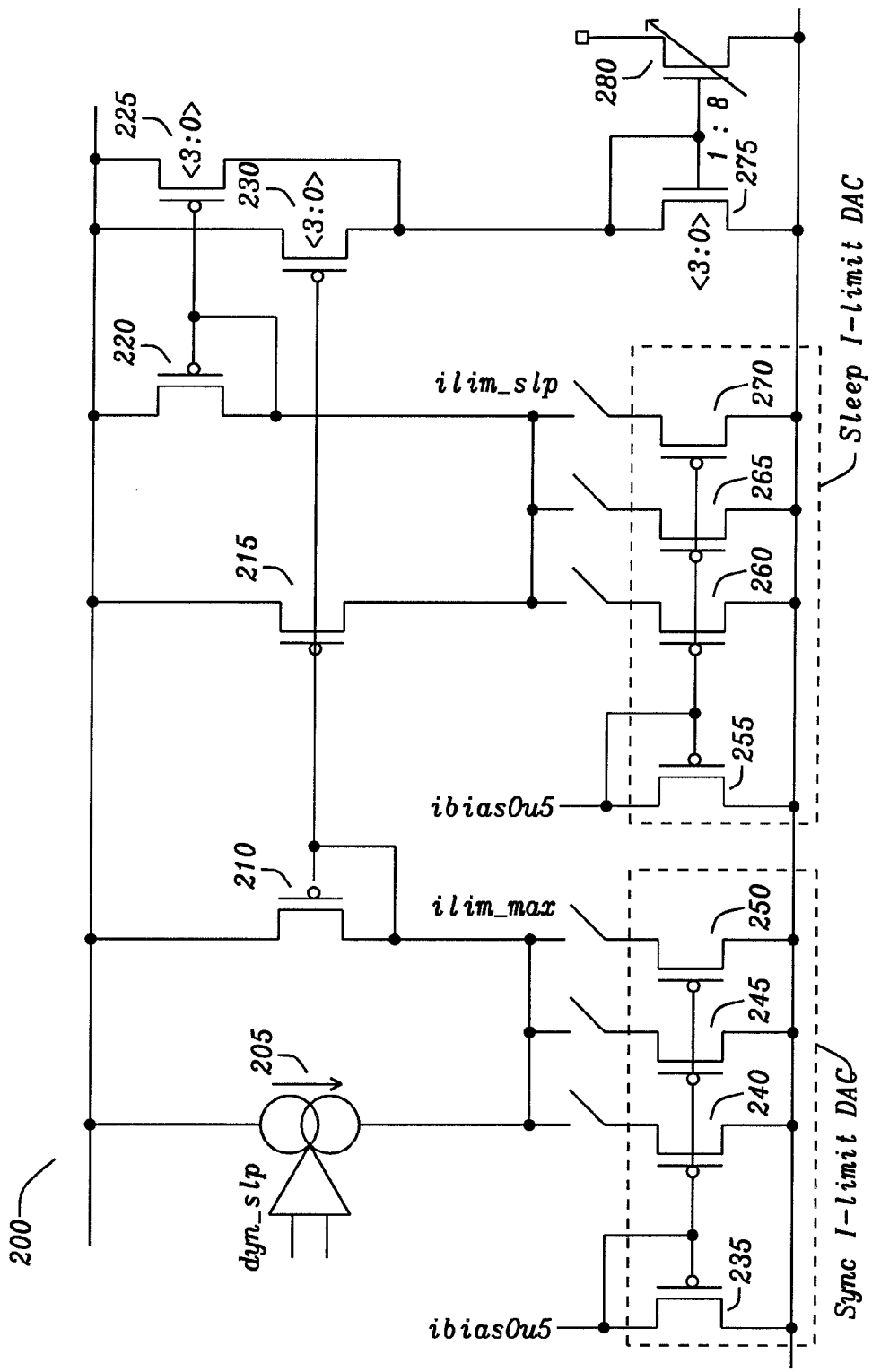
FIG. 2 shows a proposed implementation of setting the sync current limit using a Digital to Analog Converter (DAC), and subtracting current in dynamic sleep mode, embodying the principles of the disclosure.

FIG. 2 shows proposed implementation 200, of setting the sync current limit using a Digital to Analog Converter (DAC), and subtracting current in dynamic sleep mode, embodying the principles of the disclosure. On the left of the circuit, the sync current limit is defined using a current-DAC (IDAC), to create scaled reference current 205. Operational transconductance amplifier (OTA) current DYN_SLP subtracts from the current in dynamic sleep mode, but is not active in sync mode. This fixes the maximum current limit in both modes to one well-controlled value.

The resultant current, ILIM_MAX, the difference between the scaled reference current and the dynamic sleep OTA current, is mirrored in sync I-limit DAC devices 240, 245, and 250. Device 220 creates the sleep current limit reference. The mirrored version of ILIM_MAX, in device 210, is subtracted from the sleep current limit reference, in device 215. In sleep mode ILIM_MAX is set to zero, so the sleep IDAC current is output as ILIM_SLP. In sync mode, ILIM_MAX is much bigger than the sleep IDAC current, and the resultant current in ILIM_SLP is zero. In dynamic sleep mode, when ILIM_MAX falls below the sleep IDAC current, the difference current will flow in ILIM_SLP. This creates a lower current clamp function, setting the minimum current limit for sleep and dynamic-sleep modes. ILIM_SLP is mirrored in sleep I-limit DAC devices 260, 265, and 270, and combined with a mirrored version of ILIM_MAX. Input IBIAS0u5, in sync I-limit device 235 and sleep I-limit device 255, determines the bias in the mirror circuits.

The sum of the currents is equal to the sync IDAC current in sync mode, and it is equal to the sleep IDAC current in sleep mode. In dynamic sleep mode, the current can then range between the sleep IDAC current and sync IDAC current. The sync, sleep, and dynamic mode currents vary depending on the number of phases that are active in each mode.

Since a multiphase Buck switching converter has a circuit topology where basic Buck converter circuits are placed in parallel between the input and load, each of the phases is turned on at equally spaced intervals over the switching period. The total sum of the currents is used as the current limit reference for each phase of the multiphase Buck switching converter. On the right of the circuit, the current in devices 225, 230, and 275 is scaled up and sent out to each of the phases. This stage incorporates current-limit gain trimming, in device 280.

Figure 3:
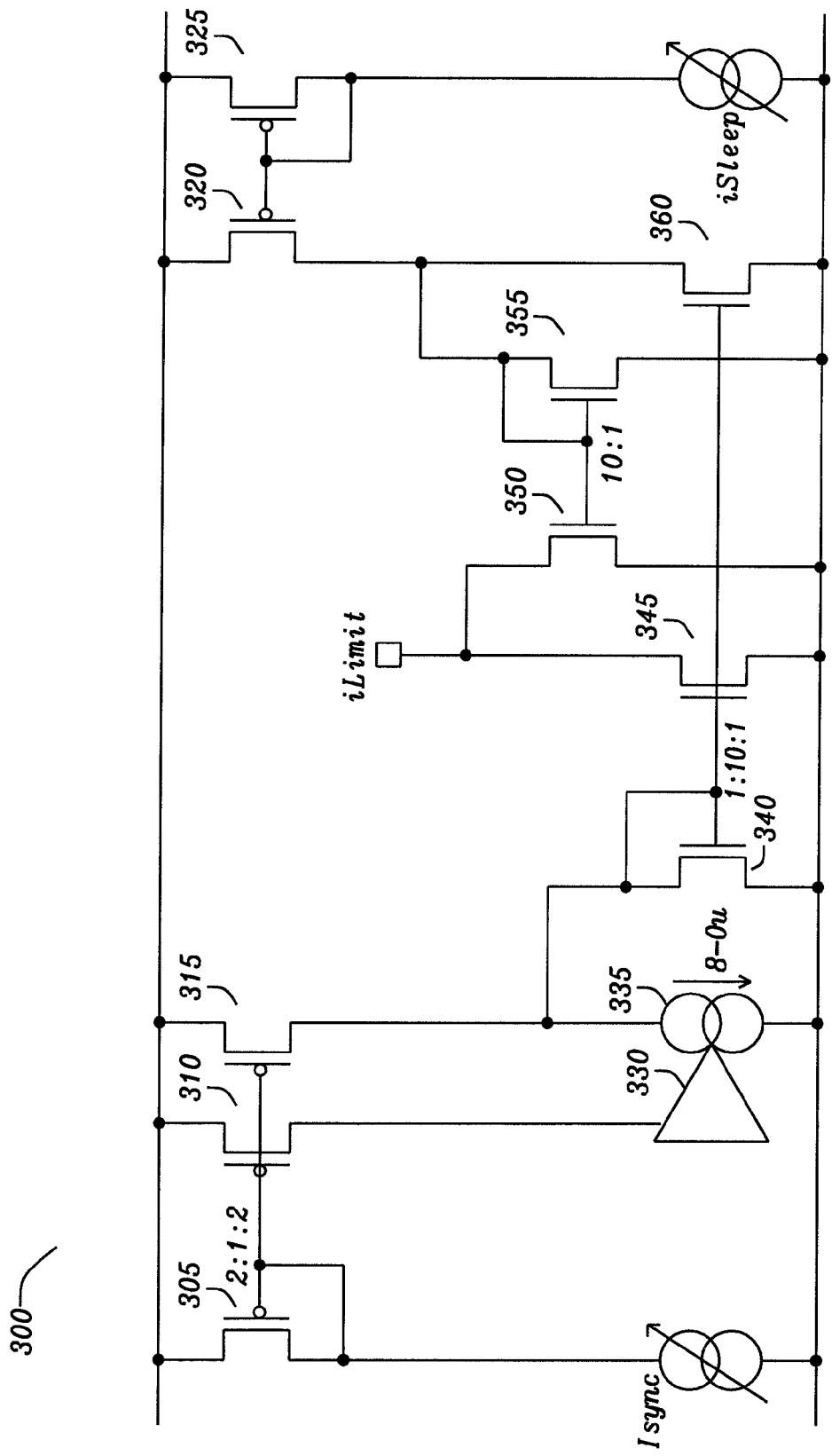
FIG. 3 illustrates an alternate embodiment, in which the sleep current limit is defined by a current-DAC, scaled to one-tenth the real current limit, embodying the principles of the disclosure.

FIG. 3 illustrates an alternate embodiment 300, in which the sleep current limit is defined by a current-DAC, scaled to one-tenth the real current limit, embodying the principles of the disclosure. The sync current limit is defined on the left of the circuit by ISYNC IDAC, and is scaled to one-tenth of the current limit reference. The current is scaled and mirrored in devices 305 and 310, to dynamic sleep amplifier 330, and in device 315, to sync current limit reference 335. The maximum current output is set, along with an offset that accurately tracks the current limit. The sync current limit reference is mirrored again and sourced to NMOS current mirror 340 and 360, and scaled up by a factor of ten in device 345. The circuit output current is then sent to each phase of a multiphase Buck switching converter.

The dynamic sleep amplifier 330 subtracts from the mirrored IDAC current, to reduce the total current limit reference, in dynamic sleep mode. If not enabled, or if the output voltage is high, then the dynamic sleep amplifier will not subtract current, and the current limit will be the full sync current limit ISYNC value. If the output voltage is low, then the dynamic sleep amplifier will subtract the full sync current from this branch, and the resultant current will be zero.

The right side of the circuit implements the sleep current limit, and the lower current clamp function for the minimum current limit. IDAC ISLEEP defines the sleep current limit. This current is mirrored by PMOS mirror devices 320 and 325, and scaled up by NMOS mirror devices 350 and 355, to output ILIMIT in parallel with the sync current limit.

Figure 4:
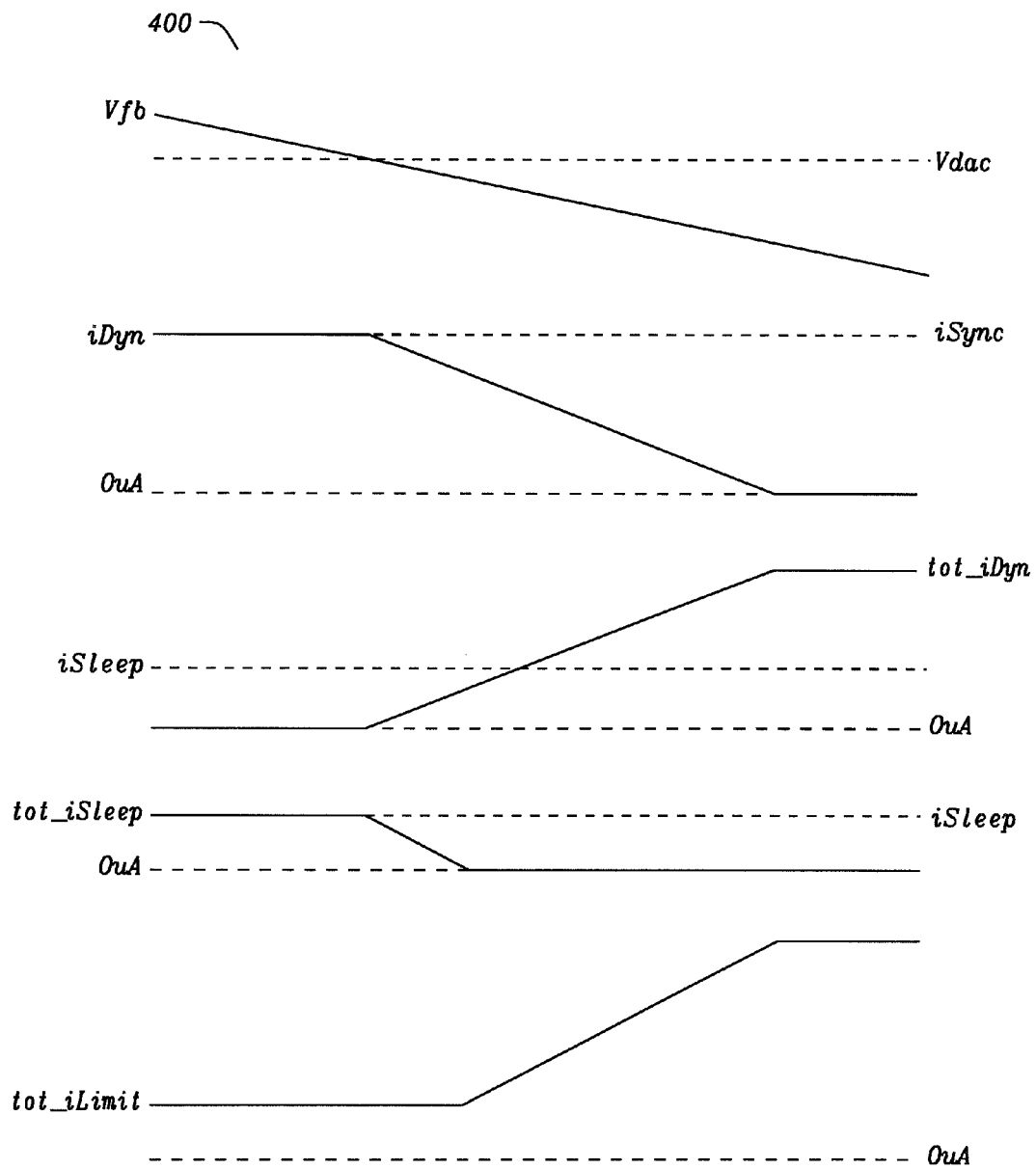
FIG. 4 shows a signal diagram for dynamic sleep and sync modes, embodying the principles of the disclosure.

FIG. 4 shows signal diagram 400 for dynamic sleep and sync modes, embodying the principles of the disclosure. The dynamic sleep amplifier subtracts from the mirrored IDAC current, to reduce total sleep current limit reference TOT_ISLEEP. If not enabled, or output voltage VFB is high compared to reference voltage VDAC, then the dynamic sleep amplifier will not subtract current, and the current limit will be the full sync current limit value IDYN=ISYNC. If output voltage VFB is low compared reference voltage VDAC, then the dynamic sleep amplifier will subtract TOT_IDYN from this branch, and resultant current IDYN will be zero.

In both dynamic sleep and sync modes, if current output TOT_ILIMIT is higher than sleep current ISLEEP, the third leg of the NMOS mirror of FIG. 3 subtracts this current from the sleep current limit reference, and the sleep current branch TOT_ISLEEP adds no extra current to the output. If the output current from the sync branch falls below the sleep current limit, the sleep current branch starts to add to the difference in TOT_ISLEEP, and keeps the total current output TOT_ILIMIT at the sleep limit current value.

Figure 5:
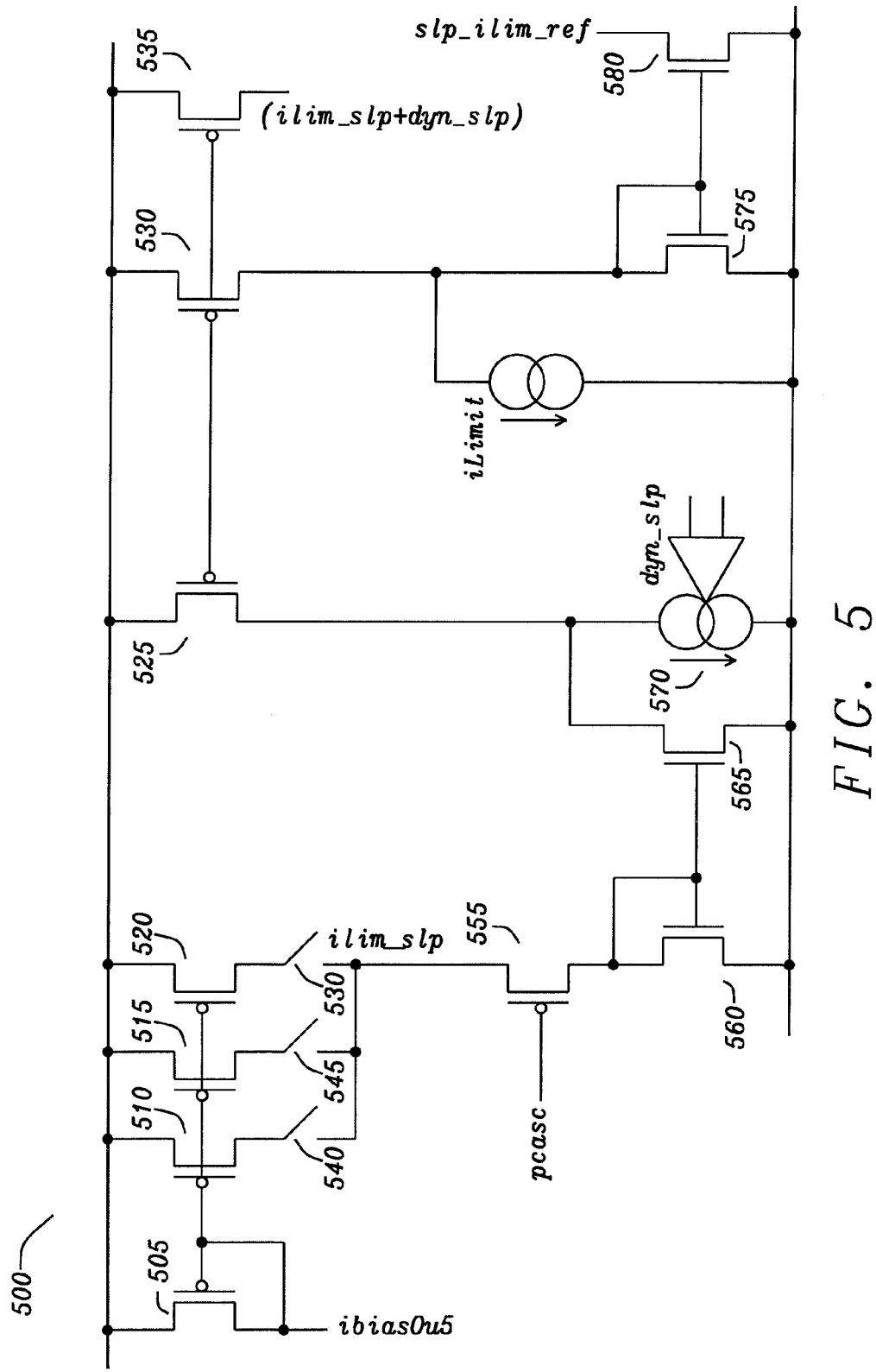
FIG. 5 illustrates a second alternate embodiment, for the basic sleep current limit reference generation architecture, embodying the principles of the disclosure.

FIG. 5 illustrates second alternate embodiment 500, for the basic sleep current limit reference generation architecture, embodying the principles of the disclosure. The IDAC at the top left, with sleep I-limit device 505 and bias current IBIAS0u5, generates a current proportional to sleep current limit ILIM_SLP. The current is mirrored in sleep I-limit DAC devices 510, 515, and 520, with switches 540, 545, and 550. The current is one-tenth of the actual sleep current limit reference, and passes through device 555 with bias current PCASC. ILIM_SLP is scaled in NMOS device 560, and mirrored in NMOS device 565. The dynamic sleep amplifier adds OTA current DYN_SLP to the sync current limit reference of 570, created with device 525 and mirrored in device 530. Input ILIMIT is introduced, and the mirror in device 535 allows the sum of the two currents, ILIM_SLP+DYN_SLP, to be measured and used for current limit clamping. The last stage of the circuit mirrors and scales the current once more, in the x10 NMOS mirror using devices 575 and 580, to create the final sleep current limit SLP_ILIM_REF. This embodiment subtracts current from the input to the current mirror to clamp the maximum current on the output.

Figure 6:
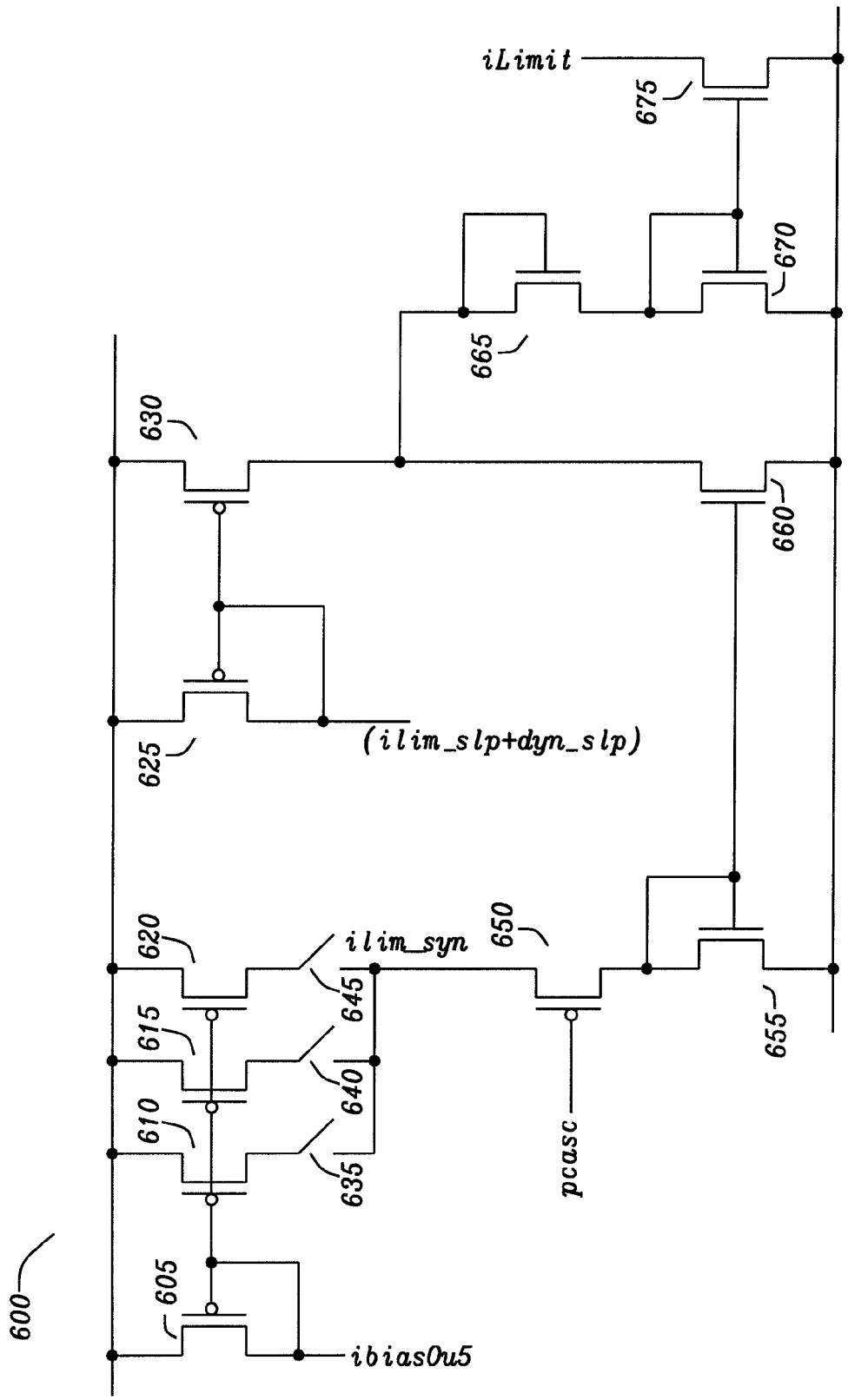
FIG. 6 shows the second stage of the circuit creating the sync current limit, for the alternate embodiment of FIG. 5, embodying the principles of the disclosure.

FIG. 6 shows second stage circuit 600, creating the sync current limit for the alternate embodiment of FIG. 5, embodying the principles of the disclosure. An IDAC at the left of the circuit, with sync I-limit device 605 and bias IBIAS0u5, generates a sync current and is mirrored in sync I-limit DAC devices 610, 615, and 620, with switches 635, 640, and 645. The current is directly compared to a mirror, in devices 625 and 630, of the sum of the sleep current limit and the dynamic sleep current limit ILIM_SLP+DYN_SLP of FIG. 5. If the sum of those currents is greater than sync current limit ILIM_SYN, through pass device 650, with bias PCASC, the voltage at the comparison point rises and extra current flows in devices 655 and 660. The difference between the sync current limit and the summed currents is drawn through ILIMIT, output of NMOS device 675. This subtracts from the input to the final stage of the current limit reference NMOS mirror, in devices 665 and 670, and limits the maximum current reference. This scheme is very stable and does not involve a control loop, giving an accurate maximum current limit with no regulation effects.

Figure 7:
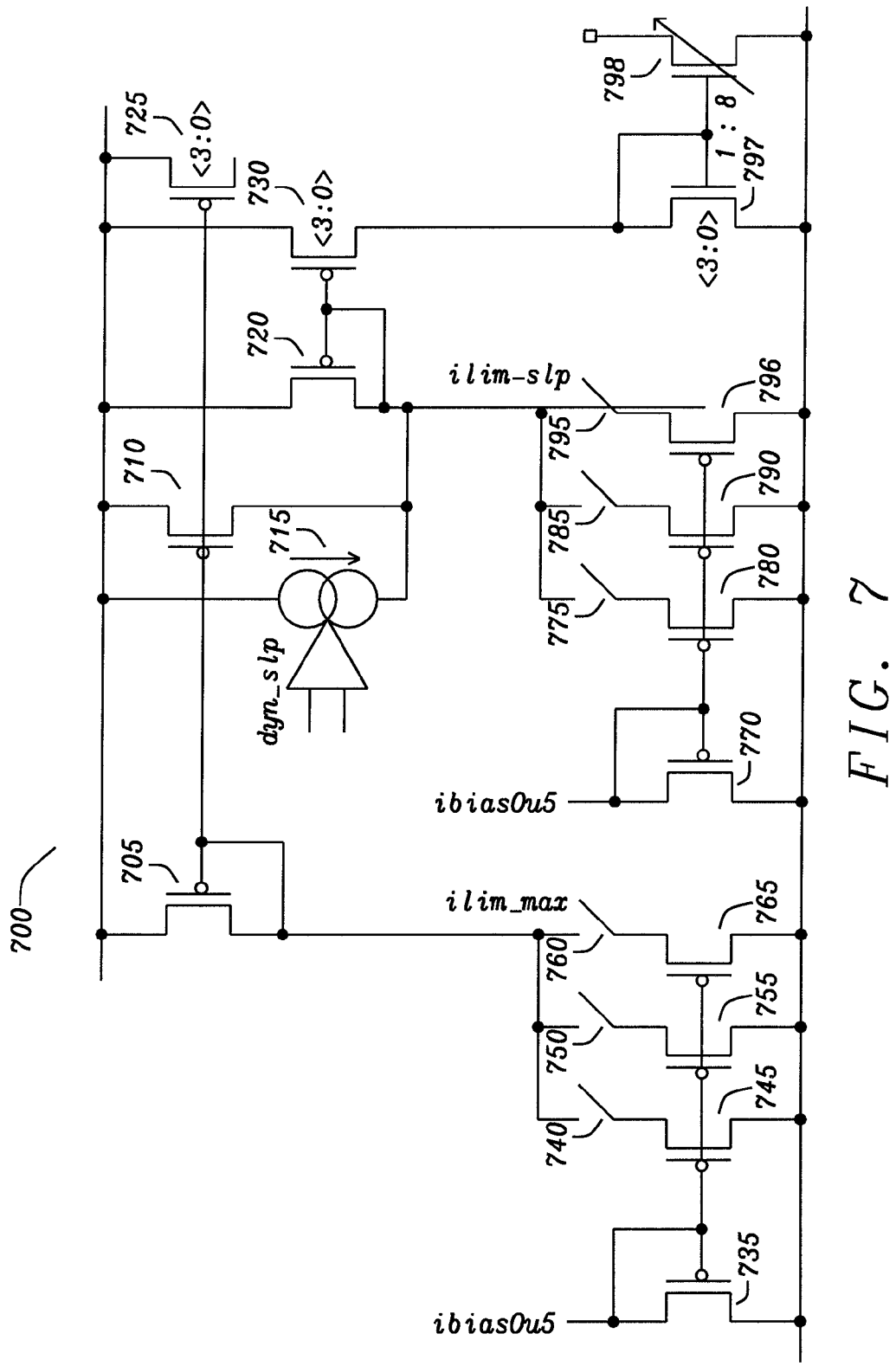
FIG. 7 illustrates a third alternate embodiment, in which the sleep current limit is defined by a current-DAC, scaled to one-eighth the real current limit, embodying the principles of the disclosure.

FIG. 7 illustrates a third alternate embodiment, in which the sleep current limit is defined by a current-DAC, scaled to one-eighth the real current limit, embodying the principles of the disclosure. Sleep current limit ILIM_SLP is defined by device 705, scaled to one-eighth of the current limit reference current. The sleep current limit is mirrored in sleep I-limit DAC devices 745, 755, and 765, with switches 740, 750, and 760, and bias IBIAS0u5, in sleep I-limit device 735. The sleep current limit is used to clamp the minimum current limit in dynamic sleep mode.

Device 710 creates the sync current limit in device 715, and with dynamic sleep amplifier current DYN_SLP, is used to clamp the maximum current limit in dynamic sleep mode. Output ILIM_MAX is mirrored in sync I-limit DAC devices 780, 790, and 796, with switches 775, 785, and 795, and bias IBIAS0u5, through sync I-limit device 770. ILIM_MAX has the sleep current limit subtracted from it, and determines the phase current limit reference currents for a multiphase Buck switching converter.

The dynamic sleep amplifier current subtracts from the IDAC sync current limit, to reduce ILIM_MAX, in dynamic sleep mode. If dynamic sleep mode is not enabled, or if the output voltage is high, the amplifier will not subtract current and the current limit will be the full sync current limit. If the output voltage is low, then the amplifier will subtract the full sync current from this branch, and the resultant current will be zero. In each phase, the current limit reference current is mirrored in 720, 725, and 730, and scaled up by a factor of eight to create the full reference current, in device 797. This stage incorporates current-limit gain trimming, in device 798.

Figure 8:
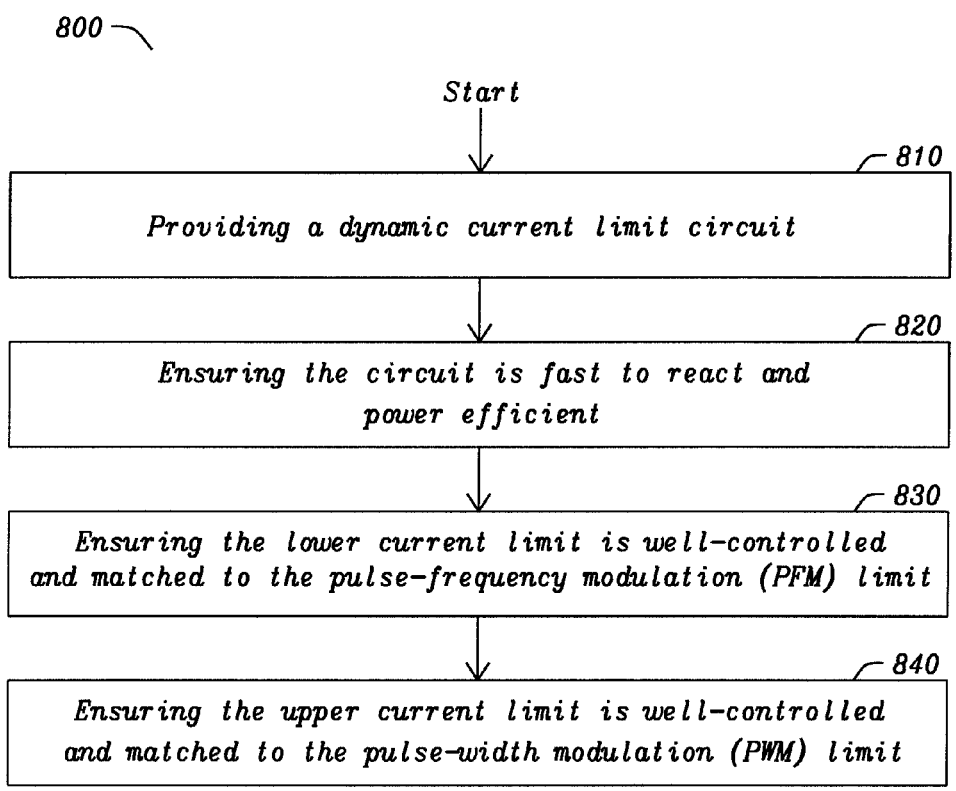
FIG. 8 is a flow chart of a method for a dynamic current limit, embodying the principles of the disclosure.

FIG. 8 is flow chart 800 of a method for a dynamic current limit, embodying the principles of the disclosure. Step 810 shows providing a dynamic current limit circuit. Step 820 shows ensuring the circuit is fast to react and power efficient. Step 830 shows ensuring the lower current limit of the dynamic current limit circuit is well-controlled and matched to the pulse-frequency modulation (PFM) limit. Step 840 shows ensuring the upper current limit of the dynamic current limit circuit is well-controlled and matched to the pulse-width modulation (PWM) limit.

The advantages of one or more embodiments of the present disclosure include maintaining the dynamic sleep current limit, by modulating the peak current with the load, and simultaneously clipping the lower and upper current limits. The proposal allows for using the clipped algebraic sums for generating optimum pulse-frequency modulation. The proposal also allows for using the clipped subtractions for mirror-based implementations. If the scheme is carefully designed, the dynamic sleep current limit is initially high, giving the best load transient response.

While this invention has been particularly shown and described with reference to the preferred embodiments thereof, it will be understood by those skilled in the art that various changes in form and details may be made without departing from the spirit and scope of the invention.

The invention claimed is:
1. A dynamic current limit circuit, comprising:
   a first current Digital to Analog Converter (IDAC), configured to provide a reference current source, for a sync current output;
   a dynamic sleep amplifier, configured to subtract current from said sync current output in dynamic sleep mode and not active in sync mode;
   a first mirror circuit, configured to mirror the difference between said sync current output and a dynamic sleep mode current output;
   a second current Digital to Analog Converter (IDAC), configured to provide a reference current source, for a sleep current output;
   a second mirror circuit, configured to subtract said dynamic sleep mode current output from said sleep current output, setting the sleep current output; and
   a third mirror circuit, configured for dynamic sleep mode.

2. The circuit of claim 1, wherein said current limit circuit is configured to maintain a maximum current in said dynamic sleep and said sync modes.

3. The circuit of claim 1, wherein said current limit circuit is configured to maintain a minimum current in said dynamic sleep and said sleep modes.

4. The circuit of claim 1, wherein said dynamic sleep mode current is configured to have a value of zero and said sync current output is configured as said sleep current output in sleep mode.

5. The circuit of claim 1, wherein said dynamic sleep mode current output is configured to be greater than said sleep current output and said sleep current output is configured to have a value of zero in sleep mode.

6. The circuit of claim 1, wherein said dynamic sleep mode current is configured to be less than said sleep current output and the difference between said dynamic sleep mode current output and said sleep current output is configured as said sleep current output in sleep mode.

7. The circuit of claim 1, wherein the sum of said sleep current output and said dynamic sleep mode current is configured to provide said sync current output in sync mode.

8. The circuit of claim 1, wherein the sum of said sleep current output and said dynamic sleep mode current output is configured to provide said sleep current output in sleep mode.

9. The circuit of claim 1, wherein the sum of said sleep current output and said dynamic sleep mode current output is configured to be a range between said sleep current output and said sync current output in dynamic sleep mode.

10. The circuit of claim 1, wherein said sync, sleep, and dynamic sleep mode currents are configured to vary depending on the number of phases that are active in each mode.

11. A dynamic current limit circuit, comprising:
a first current Digital to Analog Converter (IDAC), scaled to a factor of a current, configured to provide a reference current source, for a sync current output;
a first mirror circuit, configured to mirror and scale said sync current output;
a dynamic sleep amplifier, configured to subtract current from said sync current output in dynamic sleep mode and not active in sync mode;
a second mirror circuit, configured to mirror and scale the difference between said sync current output and a dynamic sleep mode current output;
a second current Digital to Analog Converter (IDAC), configured to provide a reference current source, for a sleep current output;
a third mirror circuit, configured to mirror and scale a sleep current output, to an output current in parallel with said sync current output.

12. The circuit of claim 11, wherein said dynamic sleep mode current output is configured to have a value of zero and said sync current output is configured as said dynamic current limit circuit output.

13. The circuit of claim 11, wherein said dynamic sleep mode current output is configured greater than said sync current output and said sync current output is configured as said dynamic current limit circuit output.

14. The circuit of claim 11, wherein said dynamic sleep mode current output is configured less than said sync current output and said sync current output is configured to have a value of zero.

15. A dynamic current limit circuit, comprising:
a first current Digital to Analog Converter (IDAC), scaled to a factor of a current, configured to provide a reference current source, for a sleep current output;
a first mirror circuit, configured to scale and mirror said sleep current output;
a pass device, configured for said mirrored sleep current output;
a dynamic sleep amplifier, configured to add current to said sleep current output;
a second mirror circuit, configured to mirror and scale the sum between said sleep current output and a dynamic sleep mode current output;
a second current Digital to Analog Converter (IDAC), configured to provide a reference current source, for a sync current output;
a third mirror circuit, configured to mirror said sync current output;
a pass device, configured for said mirrored sync current output; and
a fourth mirror circuit, configured for an output current and mirroring said output.

16. The circuit of claim 15, wherein said scaled sum between said sleep current output and said dynamic sleep mode current output is configured to provide a final sleep current output.

17. The circuit of claim 15, wherein said final sleep current output is compared to said sync current output, and if said final sleep current output is greater than said sync current output, the difference of said final sleep current output and said sync current output is configured on said output.

18. The circuit of claim 15, wherein the difference of said final sleep current output and said sync current output is configured to subtract from the input to said mirrored output.

19. A dynamic current limit circuit, comprising:
a first current Digital to Analog Converter (IDAC), scaled to a factor of a current, configured to provide a reference current source, for a sleep current output;
a first mirror circuit, configured to mirror said sleep current output;
a second current Digital to Analog Converter (IDAC), configured to provide a reference current source, for a sync current output;
a dynamic sleep amplifier, configured to subtract current from said sync current output in dynamic sleep mode and not active in sync mode; and
a second mirror circuit, configured to mirror and scale the difference between said sync current output and a dynamic sleep mode current output.

20. The circuit of claim 19, wherein said dynamic sleep mode current output is configured to have a value of zero and said sync current output is configured as an output.

21. The circuit of claim 19, wherein said dynamic sleep mode current output is configured greater than said sync current output and said sync current output is configured to said output.

22. The circuit of claim 19, wherein said dynamic sleep mode current output is configured less than said sync current output and said sync current output is configured to have a value of zero.

23. A method for a dynamic current limit, comprising the steps of:
providing a dynamic current limit circuit, comprising a sync current output, and a sleep current output;
subtracting a current from said sync current output in dynamic sleep mode;
mirroring a difference between said sync current output and a dynamic sleep mode current output;
subtracting said dynamic sleep mode current output from said sleep current output; and
mirroring said dynamic sleep mode current output.

* * * * *